UNITED STATES PATENT OFFICE.

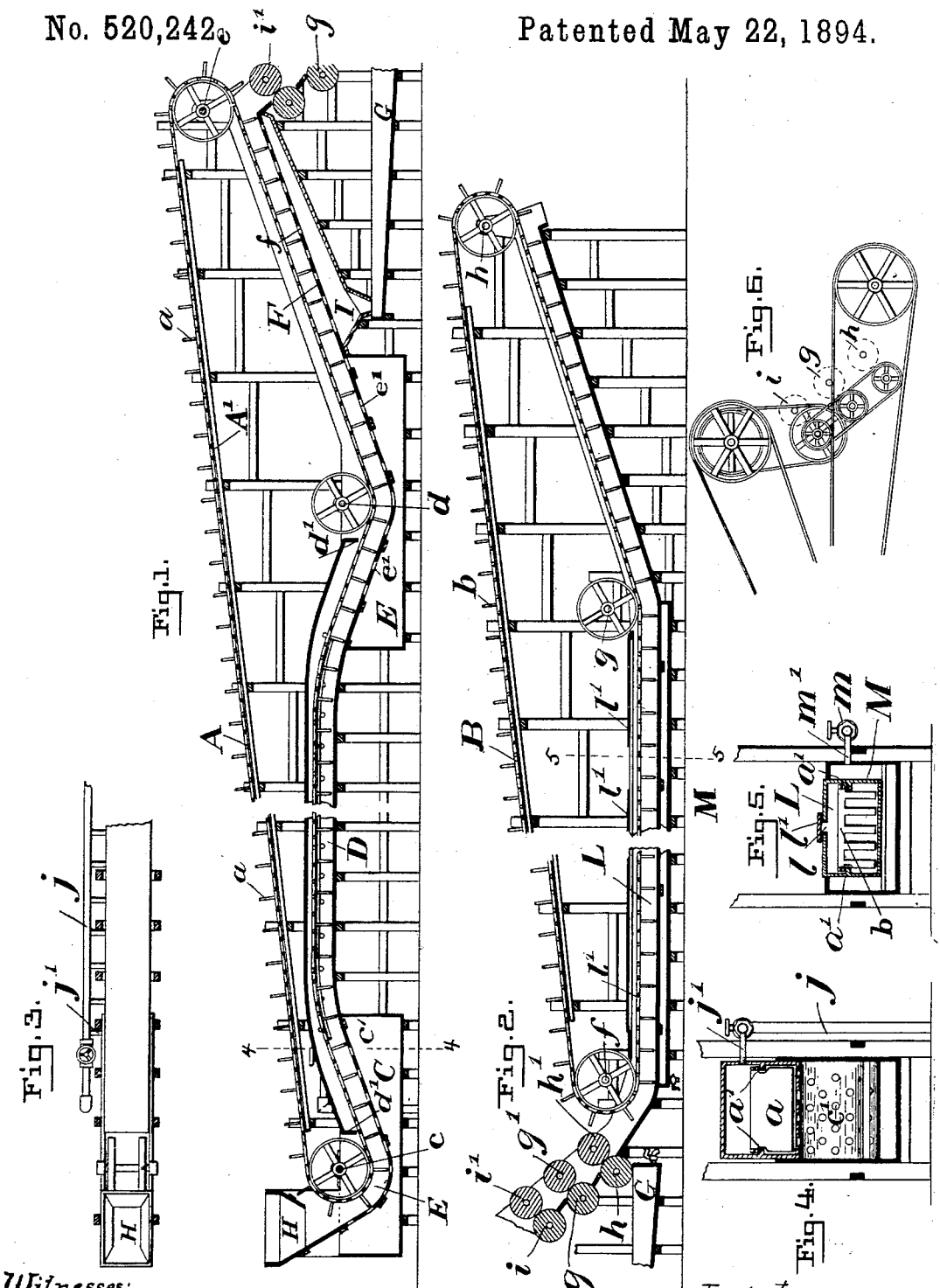

DANIEL F. OVERTON AND WILLIS E. OVERTON, OF SOLOMON'S, MARYLAND.

APPARATUS FOR EXTRACTING OIL FROM FISH.

SPECIFICATION forming part of Letters Patent No. 520,242, dated May 22, 1894.

Application filed March 24, 1893. Serial No. 467,417. (No model.)

*To all whom it may concern:*

Be it known that we, DANIEL F. OVERTON and WILLIS E. OVERTON, citizens of the United States, residing at Solomon's, in the county of Calvert and State of Maryland, have invented certain new and useful Improvements in Apparatus for Treating Fish, of which the following is a specification.

Our invention relates to an improved device for treating fish for the extraction of their oils and has for its object to provide means whereby large quantities of fish may be first cooked and afterward pressed between rollers, all without handling.

In the accompanying drawings, Figure 1, is a vertical longitudinal section of the cooking part of our apparatus; Fig. 2, a similar view of the drier part which is a continuation of the cooking part. Fig. 3, shows a top plan view of the hopper, the cooking-tunnel and a portion of the carrier and also shows the supply steam-pipe and the jet-pipes leading therefrom, to the tunnel. Fig. 4, is a cross section on the line 4—4 of Fig. 1. Fig. 5, is a similar view on the line 5—5, of Fig. 2. Fig. 6, shows the operating or driving mechanism.

Referring to the drawings it will be seen that the device consists of an endless chain-carrier A, raking along the bottom of the tunnel, which travels on two drums c, e, and is provided with depending tines or fingers, a, for a purpose to be presently described; a third drum d, is employed at a point where the chain is depressed. The lowermost stretch of the chain is operative to propel the fish, and the uppermost stretch is supported on and moves down an inclined frame, A'.

In operation, the fish are dumped into the hopper, H, located preferably at the lowermost extremity of the travel of the endless carrier, A, which passes through the open bottom of said hopper. From this point the fish are conveyed by means of the endless carrier, A, into the steam cooking-tunnel D. As illustrated in the drawings, the cooking tunnel is horizontal throughout the greater part of its length, in practice a distance of perhaps two-hundred feet, but the ends extend down into the tanks, C, and, E, respectively and to such a depth that when the water is introduced into the tanks, the open ends of the tunnel will be below the water-level. In this manner the water-tanks form seals or steam-traps for the steam-cooking-tunnel, to prevent the escape of steam therefrom. Steam is admitted to the steam cooking tunnel through jet-pipes $j'$, leading from the steam-pipe $j$. The endless carrier passes longitudinally through the tunnel and the fish taken from the hopper, are carried along by it. During their passage through the tunnel, the fish are thoroughly steamed and cooked. Leaving the tunnel the fish are conveyed through the tank, E, the water of which has access to the end of the tunnel through perforations, $e'$. While the cooking-tunnel is sufficiently large to allow the passage through it of the endless carrier and its load of fish, it is yet small enough to be heated effectively. This result is obtained through our method of disposing the endless chain carrier by which the lower stretch only of said carrier passes through the cooking-tunnel, and the upper stretch is on the outside of the same; thus the space which would be required if both stretchers were to pass through the tunnel, is saved. From the water-tank the fish are conveyed up the drip-incline F. Perforations, $f$, through said incline allow the water and any exudations of oil, to drip into the trough, I, which leads to the pan G. The compression rollers, $g$, $g'$, $h$, $h'$, $i$, $i'$, in the present instance are located preferably at the higher end of the drip-incline, though the drip-incline might be dispensed with and the compression rollers placed at the end of the cooking-tunnel.

Fig. 4, illustrates a section on the line 4—4 of Fig. 1, and shows the carrier-blade, $a$, sliding on the guide-rails, $a'$. The compression rollers $g$, $g'$, $h$, $h'$, $i$, $i'$, press the oil from the fish and the expressed oil falls down and is caught by the pan G, located beneath said rollers. A second carrier B, similar to carrier A, has one extremity adjacent to the compression rollers above mentioned, and receives the compressed fish-refuse as it leaves the rollers and conveys it into the evaporator, L, of which Fig. 5, shows a cross-section and wherein it will be seen that M, is a tight steam-jacket which surrounds the evaporator and into which steam is admitted through steam-pipes, $m'$, leading from steam-pipe, $m$. The blades, $b$, on the carrier, B, are formed by a number of tines or fingers as shown in Fig. 5. The tines or fingers of alternate blades are staggered with respect to those of the other blades, so that no two successive blades follow the same track or path around the way, the object being to stir up the fish refuse so that it will be as much as possible accessible to the drying effect of the heat. There is a slot, $l$, in the top of the evaporator-pan. Removable covers, $l'$, close said slots if desired, but it is deemed preferable to leave a slight open space between said covers, to allow the escape of vapors from the fish as they are drying. After emerging from the evaporator the dried refuse is ready for its use in the manufacture of fertilizer.

We have shown and described the cooking tunnel, the water-tanks, the drip-incline, the drip-pan and the compression rollers as used in connection with the evaporator, because in practice we use the apparatus in this manner, but the evaporator does not form part of this application, and is not claimed herein.

Fig. 6, shows a convenient arrangement for the operating or driving mechanism of the device.

It is obvious that numerous changes might be made in the details of the device as above described without departing from the spirit of the invention.

Having thus described our invention, we claim as new and desire to secure by Letters Patent—

1. In an apparatus for treating fish, the combination of a straight cooking-tunnel having down-turned ends; means for supplying heat to the cooking-tunnel; an endless carrier mounted on suitable drums and having its upper stretch outside said cooking-tunnel and its lower stretch passing through the tunnel and provided with tines or fingers which depend below and rake along the bottom of the tunnel; and a water-tank at each end of the cooking-tunnel and in which the said down-turned ends are submerged.

2. In an apparatus for treating fish, the combination of the straight cooking-tunnel having two down-turned ends each provided with perforations, $e'$; means for supplying heat to the cooking-tunnel; a hopper at one end of the tunnel through which the fish are fed to said cooking-tunnel; compression rollers adjacent the exit-end of the tunnel; a water tank in which each down-turned end of the cooking-tunnel is submerged—the water in the tanks being admitted to the tunnel through the said perforations, $e'$; and an endless carrier mounted on suitable drums and having its upper stretch outside the tunnel and its lower stretch passing through the tunnel, and provided with depending fingers which rake along the bottom of the tunnel.

3. In a device of the class described, the combination of the cooking-tunnel having down-turned ends; means for supplying heat to the cooking-tunnel; two water-tanks in which the down-turned ends of the cooking-tunnel are submerged; an endless carrier passing through the cooking-tunnel and water-tanks; a drip incline at the exit end of the cooking-tunnel; and compression rollers at the end of the drip incline and adapted to receive the fish as they pass from said drip-incline.

4. In an apparatus for treating fish, the combination of a tubular cooking-tunnel; a supply hopper connected with one end of the said tunnel; a drip-incline adjacent the other end of the tunnel and having perforations, $f$; an incline trough below the drip-incline; compression rollers at the upper end of the drip-incline; and an endless carrier passing through the tubular tunnel from the hopper and up the drip-incline to the compression rollers, as set forth.

5. In a device of the class described the combination of the steam-cooking-tunnel having down-turned ends; an endless-carrier passing therethrough; a water-tank sealing each end of the cooking tunnel; a drip-incline adjacent to one end of the cooking-tunnel; compression rollers adjacent to one end of the drip-incline; a drip-trough below the drip-incline and an oil-collecting pan below the compression-rollers and drip-trough, as described.

In testimony whereof we affix our signatures in the presence of two witnesses.

DANIEL F. OVERTON.
WILLIS E. OVERTON.

Witnesses:
M. M. DAVIS,
JNO. J. SAUNDERS.